No. 711,670. Patented Oct. 21, 1902.
G. W. McGILL.
SPRING BUTTON.
(Application filed Apr. 30, 1902.)
(No Model.) 3 Sheets—Sheet 1.

WITNESSES:
C. H. Bertholf.
W. Harry McGill.

INVENTOR
George W. McGill

THE NORRIS PETERS CO., PHOTO-LITHO., WASHINGTON, D. C.

No. 711,670. Patented Oct. 21, 1902.
G. W. McGILL.
SPRING BUTTON.
(Application filed Apr. 30, 1902.)
(No Model.) 3 Sheets—Sheet 2.

WITNESSES:
C. H. Bertholf.
W. Narry McGill.

INVENTOR
George W. McGill

THE NORRIS PETERS CO., PHOTO-LITHO., WASHINGTON, D. C.

No. 711,670. Patented Oct. 21, 1902.
G. W. McGILL.
SPRING BUTTON.
(Application filed Apr. 30, 1902.)

(No Model.) 3 Sheets—Sheet 3.

WITNESSES:
C. H. Bertholf.
W. Harry McGill.

INVENTOR
George W. McGill

UNITED STATES PATENT OFFICE.

GEORGE W. McGILL, OF RIVERDALE, NEW YORK.

SPRING-BUTTON.

SPECIFICATION forming part of Letters Patent No. 711,670, dated October 21, 1902.

Application filed April 30, 1902. Serial No. 105,268. (No model.)

*To all whom it may concern:*

Be it known that I, GEORGE W. MCGILL, a citizen of the United States, and a resident of Riverdale, in the county of New York and State of New York, have invented certain new and useful Improvements in Spring-Buttons, of which the following is a specification.

My invention relates to spring-buttons or fastening devices for gloves and such like purposes in which stud and socket members are employed to be inserted one within the other; and it consists in an improved mode of constructing the stud member of such devices, and specifically in an improved mode of constructing the spring stud member of the fastening device secured to me by United States Letters Patent No. 691,164, dated January 14, 1902, in which such stud member is made from a disk of sheet metal struck up to form an annular projection or stud having a reëntrant cavity central therewith and an outside encircling base-flange, the projecting annular stud being radially slotted in manner to divide its annular crown into a plurality of looped spring-sections having their opposite ends leading, respectively, from such outside encircling base-flange and the base of such reëntrant central cavity.

In my improved device herein described the stud member consists of four pieces, as follows: a fingered spring part A, a holding-collar B, a base-plate C, and an attaching-eyelet or riveting-plate D.

Figure 1:
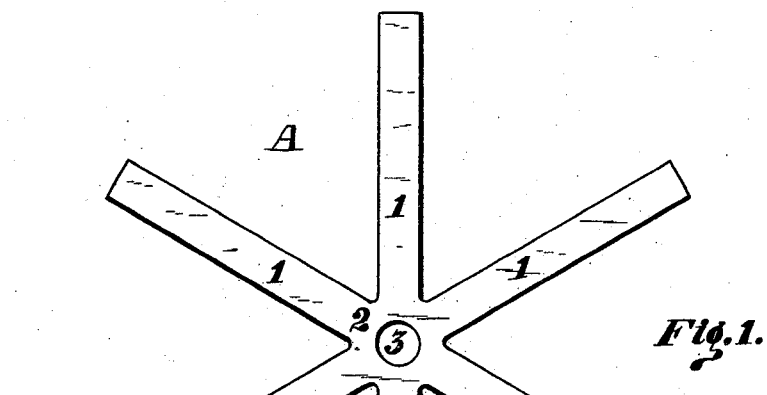
Figure 2:
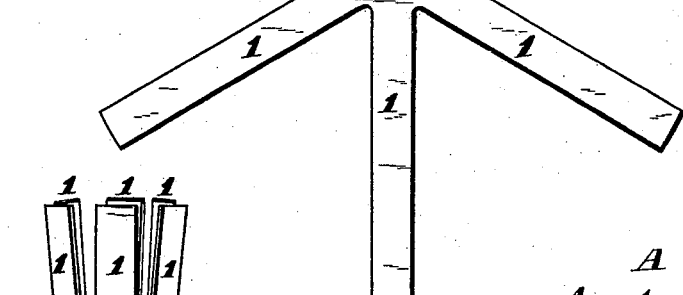
Figure 3:
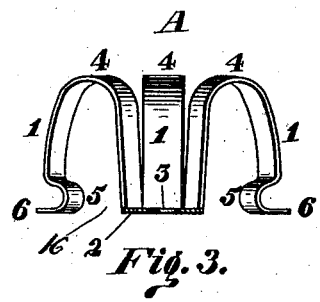
Figure 4:
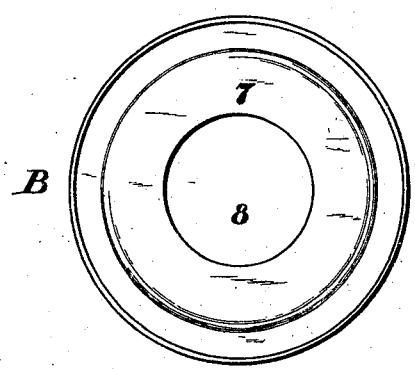
Figure 5:
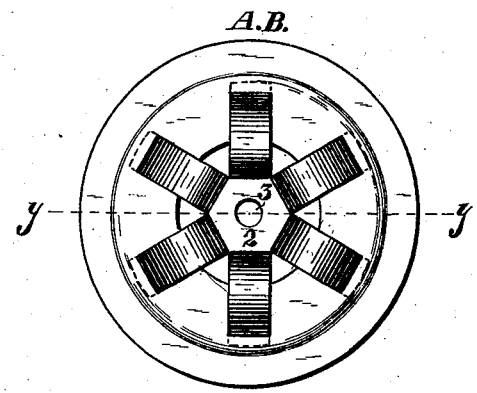
Figure 6:
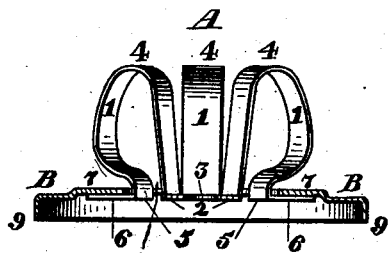
Figure 7:
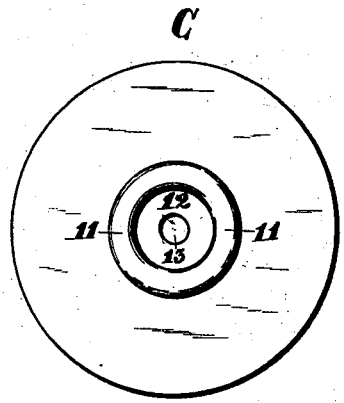
Figure 8:
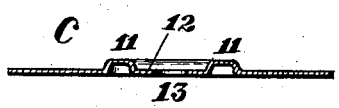
Figure 9:
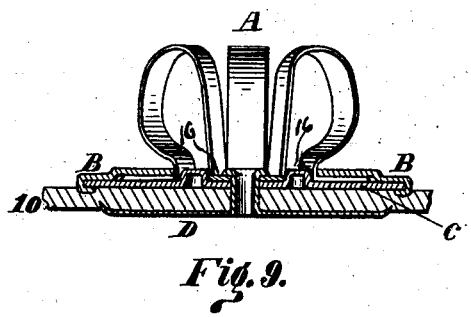
Figure 11:
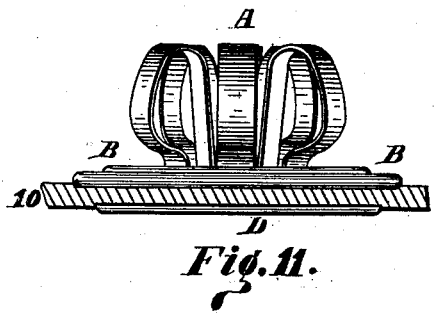
Figure 10:
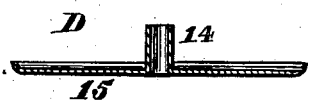
Figure 12:
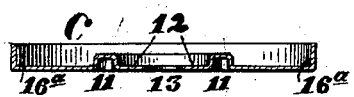
Figure 13:
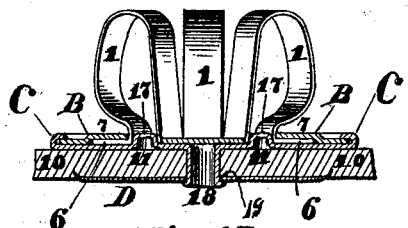
Figure 14:
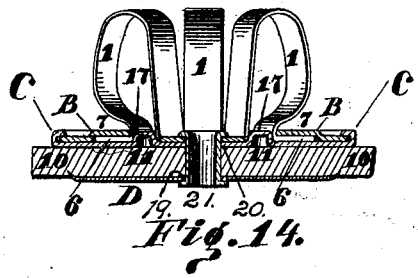
Figure 15:
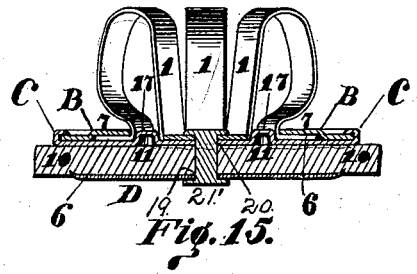

In the accompanying drawings, in which similar reference letters and numerals indicate corresponding parts, Figure 1 shows a plan view of the metal blank of the spring part A, consisting of a series of spring-fingers 1, radiating from a common center 2, which center is provided with an opening 3. Fig. 2 is a side elevation of Fig. 1, having its center struck in a manner to cup its center and project its fingers 1 upward and outward, producing a basket-like formation. The fingers forming the sides of this formation are further folded into loops, as shown in Fig. 3—that is to say, they are each folded outward and downward at point 4, then inward to a point, providing the heel 5, and again outward, providing the foot 6 and the open space 16 in the base part of each of such loops. Fig. 3 is a sectional side elevation of one-half of the spring part so folded, showing the three farther or opposite looped spring-fingers thereof. Fig. 4 is a plan view of the holding-collar B, provided with an annular chamber or space 7, surrounding a central opening 8, and a dependent rim 9. This collar is intended to be sprung over the radially-disposed looped spring-fingers of the spring part A, as shown in the plan view Fig. 5 and in Fig. 6, which is a sectional side elevation of Fig. 5, taken on its line $y\,y$. Fig. 7 is a plan view, and Fig. 8 a cross-section, of the base-plate C of the device, provided on its upper surface with an annular ridge producing a chamber central therewith and an outer flange encircling such ridge. Fig. 9 is a cross-sectional elevation of the completed device attached to a fabric 10. Fig. 10 is a cross-sectional side view of the attaching-eyelet or riveting-plate D of the device, and Fig. 11 is a side elevation of the completed device attached to a fabric, the latter, 10, being shown in section. Fig. 12 is a central transverse section of the base-plate C, provided with a rim $16^a$ at right angles with its body part. Fig. 13 is a view similar in Fig. 9, excepting that the collar B is shown therein without the dependent rim 9, and the base-plate C is shown provided with a rim 16, as shown in Fig. 12, and with a dependent tubular riveting-stem 18 integral with its open center and having its free end flanged upon the under surface of the riveting-plate D, which latter is shown with a central aperture 19 and without a tubular stem. Figs. 14 and 15 are views similar to Fig. 13, excepting that instead of the base-plate C being provided with the tubular stem 18 it is provided with a central aperture 20, and a detached tubular stem 21 is shown binding the parts in Fig. 14, while a solid rivet 21' is shown performing the same office in Fig. 15.

In composing the device the fingered metal blank from which the spring part A of the device is fashioned is first struck in manner to cup its center 2 and project upward and outward its radiating spring-fingers 1, as shown in the drawings. These fingers, folded, looped, and radially disposed around the cupped center 2, as before described, are sprung through the open center 8 of the collar B, their bulging spring-loops projecting over the outer surface of the top of such collar and their hooked feet occupying the annular space 7 in the under surface of same. The base-plate C is now inserted in the collar, with its annular ridge 11 projecting upward and occupying the open space 16 in the base of the loops of the spring part, the lower surface of such cupped center 2 occupying the chamber 12 of the base-plate C. The depressed rim 9 of the collar B is now closed in upon the under surface of the periphery of the base-plate C, securing the latter in said collar, locking the feet 6 of the loops of the spring part in the annular space 7 of such collar, and securing the cupped center 2 of such spring part in the chamber 12 of the base-plate and permanently securing the parts in such positions with their respective openings 3, 8, and 13 coinciding, completing the device, which when thus completed is secured to a fabric 10 by passing the tubular stem 14 of the attaching-eyelet or riveting-plate D up through an opening of corresponding diameter made in such fabric and having its free end entered through the openings 3 8 13 in the stud proper and upsetting such free end in manner to flange it upon the floor of the cupped center 2 of the spring part A, as shown in section in Fig. 9, wherein the fabric 10 is represented as clamped and riveted between the folded rim of the collar B, under surface of the base-plate C, and upper surface of the flange 15 of the attaching-eyelet or riveting-plate D.

The dependent rim 9 may be omitted from the collar B, as shown in Figs. 13, 14, and 15, and transferred as a vertical rim to the base-plate C instead, as shown in those figures and in Fig. 12, so that the connection between the collar and the base-plate may be secured by crimping or flanging such vertical rim over the outer edge of the collar, as shown in Figs. 13, 14, and 15, and the center chamber 12 of said base-plate may be provided with a dependent tubular riveting-stem 18 to be passed down through the fabric, to which the stud member may be attached, and through a hole in the center of the plate D and riveted or flanged on the under surface thereof, as shown in Fig. 13, obviating its tubular stem as well as the opening 3 in the cupped center of the spring part A, or instead of furnishing the base-plate C with such tubular riveting-stem and omitting the opening 3 a detached eyelet or rivet may be used in securing the stud to the fabric by upsetting the unflanged end of such eyelet or rivet on the floor of the cupped center of the spring part A, as in Fig. 14, where a tubular rivet or eyelet is shown, or on the under surface of said attaching-plate D, as in Fig. 15, where a solid rivet is shown.

The spring stud member constructed as herein described will interlock with receiving socket members or eyelets of varying construction having the diameter of their receiving sockets or openings less than the diameter or spread of the bulb formed by the radially-disposed spring-loops forming the stud proper.

Having described my invention, what I claim is—

1. In a spring-button or fastening device such as described, the spring part of the stud member fashioned from a metal blank consisting of a series of spring-fingers radiating from a center part common to and integral with all such fingers, said fingers being projected upward and outward from and around such center part, and folded over intermediate their free ends and their connected ends, and downward, into a series of spring-loops radially disposed around and above such center part.

2. In a spring-button such as described, the spring part of its stud member fashioned from a metal blank consisting of a series of spring-fingers radiating from a center part common to and integral with the inner end of all such fingers, said fingers being projected upward and outward from and around such center part, and folded over, intermediate their free or outer ends and their connected or inner ends, and downward, into a series of spring-loops radially disposed around and above such center part and having their free ends folded into hooked feet.

3. In a spring-button such as described, a stud member having its spring part fashioned from a metal blank consisting of a series of flat spring-fingers radiating from a center part common to and integral with the inner end of all such fingers, said fingers being projected above and outward from and around such center part, and folded over and outward, intermediate their free or outer ends and their connected or inner ends, and downward and inward, into a series of spring-loops radially disposed around and above such center part, and having their free ends folded into hooked feet, and a collar adapted to receive and hold in vertical position above its one, or upper, surface, such series of radially-disposed spring-loops and hold below its other, or under, surface the hooked feet of such loops.

4. In a spring-button such as described, a stud member having its spring part fashioned from a metal blank consisting of a series of spring-fingers radiating from a center part common to and integral with the inner end of all such fingers, said fingers being projected above and outward from and around such center part, and folded over and outward, intermediate their free or outward ends and their connected or inner ends, and downward and inward, into a series of spring-loops radially disposed around and above such center part, and having their free ends folded into hooked feet, a collar adapted to receive and hold in vertical position above its one, or upper, surface such series of radially-disposed spring-loops and hold below its other, or under, surface the hooked feet of such loops and a base-plate adapted to support in such collar the spring part and to engage in flanged connection with the rim of such collar in securing such spring part therein.

5. In a spring-button or fastening device, a stud member having a spring part consisting of a plurality of spring-loops open at their base and radially disposed around and above a sunken center of cupped formation, the inner ends of said open loops being integral with such sunken center and their outer ends terminating in hooked feet and occupying a plane corresponding with the plane of the sunken center; a collar provided with a central aperture of a diameter sufficient to admit of its being passed or sprung over the bulging outer sides of such loops and encircle them at the fold forming their hooked feet, and to rest in such fold, and a base-plate to support the loops in such collar, such base-plate provided with an annular ridge projecting from its upper surface to occupy the base-openings leading into such loops and maintain the spread of their arms at that point and having a chamber central to such ridge to receive and seat therein the sunken center of the spring part and an outer flange encircling such ridge to bear against the under surface of the hooked feet of the loops and engage in flanged connection with the rim of the collar in securing together the parts of the stud when so assembled.

6. In a spring-button such as described, a stud member having a base-plate provided centrally on its upper surface with an upward-projecting annular ridge, a central chamber produced therein by such ridge and encircling such ridge an outer flange having a rim projecting upward parallel with such ridge, in combination with a spring part consisting of a plurality of spring-loops open at their base and radially disposed around and above, and integral with, a sunken center of cupped formation, such sunken center adapted to rest in and occupy the central chamber of the base-plate, with the spring-loops radiating from such sunken center spanning the annular ridge of such base-plate.

7. In a spring-button or fastening device, a stud member comprising a spring part A, composed of a plurality of spring-fingers radially disposed and looped around and above a sunken center integral with the inner ends of such fingers, a collar B, adapted to encircle and hold the bulging looped part of such fingers in vertical position above its outer upper surface and the free ends of same beneath such surface, and a base-plate C, adapted to support such spring part in the collar B, and engage with the rim thereof in flanged connection in securing together the parts so assembled in producing such stud member, in combination with a riveting-plate D, adapted to clamp between itself and the stud member the fabric or other material to which such stud member may be attached; and means of riveting together such plate and stud member to secure the fabric between them, and the stud member to such fabric.

8. In a spring-button or fastening device a stud member comprising a spring part A, consisting of a plurality of spring-loops open at their base and radially disposed around and above a sunken center of cupped formation, the inner ends of the fingers forming such loops being integral with such sunken center, and their outer ends terminating in hooked feet; a base-plate C, provided on its upper surface with a central chamber to receive therein the base of the sunken center of the spring part, an annular ridge surrounding such chamber to occupy the base-openings of the radially-disposed loops of such spring part, and a flange surrounding such ridge to support the feet of such loops; a collar B, provided with a central aperture to receive and encircle, at their outer base, the loops of such spring part, and to cover the upper surface of their feet, and a rim to engage in flanged connection with the rim of the base-plate C; the sunken center of the spring part A, and the central chamber on the base-plate C, each provided with a central opening coinciding one with the other adapting the stud member, so constructed, in being attached to a fabric, to receive vertically through its center the stem of an attaching-plate D, and have the free end of such stem upset or flanged outwardly upon the top surface of the base of the sunken center of the spring part A, with the fabric secured between the inner surface of such attaching-plate D, and the outer or under surface of the base-plate C.

9. In a spring-button or fastening device, a stud member comprising a spring part A, providing a plurality of spring-loops radially disposed around, and integral with, a sunken center; a collar B, provided with a central aperture encircling the base of such radially-disposed spring-loops, and a base-plate C, provided with a central chamber supporting therein the base of the sunken center of the spring part, such chamber of the base-plate, and sunken center of the spring part, provided with coinciding central apertures admitting of the stud member, so formed, being attached to a fabric, or other article, by passing an eyelet or rivet, through such coinciding central apertures and through the fabric, with the headed end of the rivet or eyelet bearing upon the upper surface of the sunken center of the spring part and its other end upset or flanged upon the under surface of a clamping-plate D, on the opposite side of such fabric.

10. In a spring-button or fastening device such as described, a stud member comprising a spring part A, consisting of a plurality of spring-fingers radiating from and integral with a common center, such fingers folded intermediate their connected, or inner ends, and their free, or outer ends, into loops radially disposed around and above such common center, and such center provided with an aperture to receive the stem of an attaching rivet or eyelet.

Signed at New York city, in the county of New York and State of New York, this 15th day of April, A. D. 1902.

GEORGE W. McGILL.

Witnesses:
JOHN E. FRYER,
W. HARRY McGILL.